(12) United States Patent
Duran Gonzalez et al.

(10) Patent No.: US 11,016,893 B2
(45) Date of Patent: May 25, 2021

(54) METHOD AND APPARATUS FOR SMART STORE OPERATIONS WITH CONDITIONAL OWNERSHIP REQUESTS

(71) Applicant: Intel Corporation, Santa Clara, CA (US)

(72) Inventors: Alejandro Duran Gonzalez, Esplugues de Llobregat (ES); Francesc Guim Bernat, Barcelona (ES)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/329,595

(22) PCT Filed: Sep. 30, 2016

(86) PCT No.: PCT/EP2016/001627
§ 371 (c)(1),
(2) Date: Feb. 28, 2019

(87) PCT Pub. No.: WO2018/059655
PCT Pub. Date: Apr. 5, 2018

(65) Prior Publication Data
US 2019/0220407 A1   Jul. 18, 2019

(51) Int. Cl.
*G06F 12/08* (2016.01)
*G06F 12/0815* (2016.01)
(Continued)

(52) U.S. Cl.
CPC ...... *G06F 12/0815* (2013.01); *G06F 9/30072* (2013.01); *G06F 12/0811* (2013.01);
(Continued)

(58) Field of Classification Search
CPC .......... G06F 12/0811; G06F 12/0815; G06F 12/0891; G06F 12/084; G06F 12/1009;
(Continued)

(56) References Cited

U.S. PATENT DOCUMENTS 5,404,483 A * 4/1995 Stamm .................. G06F 9/3836
711/108
5,987,571 A * 11/1999 Shibata ............... G06F 12/0831
711/137
(Continued)

FOREIGN PATENT DOCUMENTS

EP          1363188 A1    11/2003

OTHER PUBLICATIONS

N. Chaturvedi, P. Sharma and S. Gurunarayanan, "An adaptive coherence protocol with adaptive cache for multi-core architectures," 2013 International Conference on Advanced Electronic Systems (ICAES), Pilani, 2013, pp. 197-201. (Year: 2013).*
(Continued)

*Primary Examiner* — Khoa D Doan
(74) *Attorney, Agent, or Firm* — Nicholson De Vos Webster & Elliott LLP

(57) ABSTRACT

Method and apparatus implementing smart store operations with conditional ownership requests. One aspect includes a method implemented in a multi-core processor, the method comprises: receiving a conditional read for ownership (CondRFO) from a requester in response to an execution of an instruction to modify a target cache line (CL) with a new value, the CondRFO identifying the target CL and the new value; determining from a local cache a local CL corresponding to the target CL; determining a local value from the local CL; comparing the local value with the new value; setting a coherency state of the local CL to (S)hared when the local value is same as the new value; setting the coherency state of the local CL to (I)nvalid when the local value is different than the new value; and sending a response and a copy of the local CL to the requester. Other embodiments include an) apparatus configured to perform the actions of the methods.

25 Claims, 15 Drawing Sheets

(51) Int. Cl.
*G06F 12/0831* (2016.01)
*G06F 9/30* (2018.01)
*G06F 12/0811* (2016.01)
*G06F 12/0891* (2016.01)

(52) U.S. Cl.
CPC ...... *G06F 12/0831* (2013.01); *G06F 12/0833* (2013.01); *G06F 12/0891* (2013.01)

(58) Field of Classification Search
CPC ............. G06F 12/0842; G06F 12/0833; G06F 2212/1016; G06F 2212/621
See application file for complete search history.

(56) References Cited

U.S. PATENT DOCUMENTS

| | | | |
|---|---|---|---|
| 6,098,156 A | 8/2000 | Lenk | |
| 6,678,800 B1* | 1/2004 | Kurihara | G06F 12/0815 711/141 |
| 7,496,713 B1* | 2/2009 | Ward | G06F 12/0831 711/141 |
| 7,805,575 B1* | 9/2010 | Agarwal | G06F 12/0811 711/141 |
| 8,935,485 B2* | 1/2015 | Jalal | G06F 12/084 711/147 |
| 2002/0112130 A1* | 8/2002 | Arimilli | G06F 12/0815 711/141 |
| 2003/0041225 A1 | 2/2003 | Mattina et al. | |
| 2003/0097528 A1* | 5/2003 | Arimilli | G06F 12/0831 711/141 |
| 2004/0059871 A1* | 3/2004 | Arimilli | G06F 12/0811 711/122 |
| 2004/0068622 A1* | 4/2004 | Van Doren | G06F 12/084 711/146 |
| 2004/0073756 A1* | 4/2004 | Arimilli | G06F 9/3004 711/146 |
| 2004/0117563 A1* | 6/2004 | Wu | G06F 11/2071 711/150 |
| 2006/0059317 A1* | 3/2006 | Kakeda | G06F 12/0833 711/145 |
| 2006/0224829 A1* | 10/2006 | Evrard | G06F 12/0891 711/133 |
| 2007/0011408 A1* | 1/2007 | Shen | G06F 12/0831 711/146 |
| 2007/0043915 A1 | 2/2007 | Moir et al. | |
| 2009/0157965 A1 | 6/2009 | Shum et al. | |

OTHER PUBLICATIONS

International Preliminary Report on Patentability for Application No. PCT/EP2016/001627, dated Apr. 11, 2019, 7 pages.
International Search Report and Written Opinion for Application No. PCT/EP2016/001627, dated Jun. 16, 2017, 11 pages.

* cited by examiner

METHOD AND APPARATUS FOR SMART STORE OPERATIONS WITH CONDITIONAL OWNERSHIP REQUESTS

FIELD

Embodiments of the invention relate to the field of computer architecture and specifically, to data transfer.

BACKGROUND INFORMATION

In software applications, it is not uncommon for code to make repeat updates to the same memory locations over and over again. Often times, the value to be written into a memory location is the same as the existing value already stored at that location. In these cases, updating the memory location with the same value is redundant and unnecessary. Typically this is not a serious issue and most programmers, out of convenience or lack of concern for performance, simply use the following code syntax to store or update a value in memory:

var=val

However, in instances where the spatial locality in memory is low and the sharing ratio between threads of the same or close-by data is high, such as often the case with control blocks, unnecessary updates to memory can result in noticeable performance degradation and thus should be avoided when possible.

In a shared memory multi-core processor system with separate cache memory for each core, many copies of the same cache line can exist at the same time. For instance, a copy of a cache line may reside in main memory while another copy is cached in the local cache memory of one or more of the cores. When one copy of the cache line is changed, other copies of the same cache line must also be changed or invalidated in order to maintain coherency between the different copies. To prevent collisions that occur when multiple cores try to make overlapping changes to the same cache line, a core that desires to modify a cache line must first own the cache line it intends to modify. Typically, to establish ownership of a cache line, a first core broadcasts to the other cores a Read for Ownership or a Request for Ownership message through its caching agent to invalidate all copies of that cache line in other cores. Then a second core which owns a copy of the cache line in its local cache will invalidate its copy upon receiving the message. Later, if the second core wishes to access from its local cache the copy of the cache line, a cache miss would result because its copy is no longer valid. The second core would then need to issue a read, read for ownership, or request for ownership message, depending on the type of access desired, to acquire a valid copy of the cache line. The message sent out by second core may in turn invalidate other copies of that cache line and cause a similar local cache miss when another core tries to access the invalidated cache line down the road. This global invalidation of a particular cache line due to write requests occurs even if such acquisition is unnecessary, such as, for example, when the value to be written into the cache line is the same as what is already stored. To reduce the occurrence of these kind of situations, more advanced programmers tend to use the following syntax when storing or updating to a memory location:

if (var< >val) var=val

This ensures that the store or update operation, and associated Read for Ownership or Request for Ownership messages that follow, only happens when the value in that memory location is actually different than what will be written.

While useful in many case, this approach comes with its own set of drawbacks. For instance, it requires extra code which, in case of large number of stores, can lead to a significant increase in code size. Also, the added check complicates the control flow and may limit the ability for compilers to apply code optimizations such as vectorization, loop invariant code motion, etc. Moreover, the predicate condition introduces numerous branches and tends to pollute the branch prediction table, not to mention the high performance and recovery cost in the event of incorrect predictions.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DETAILED DESCRIPTION

Figure 1:
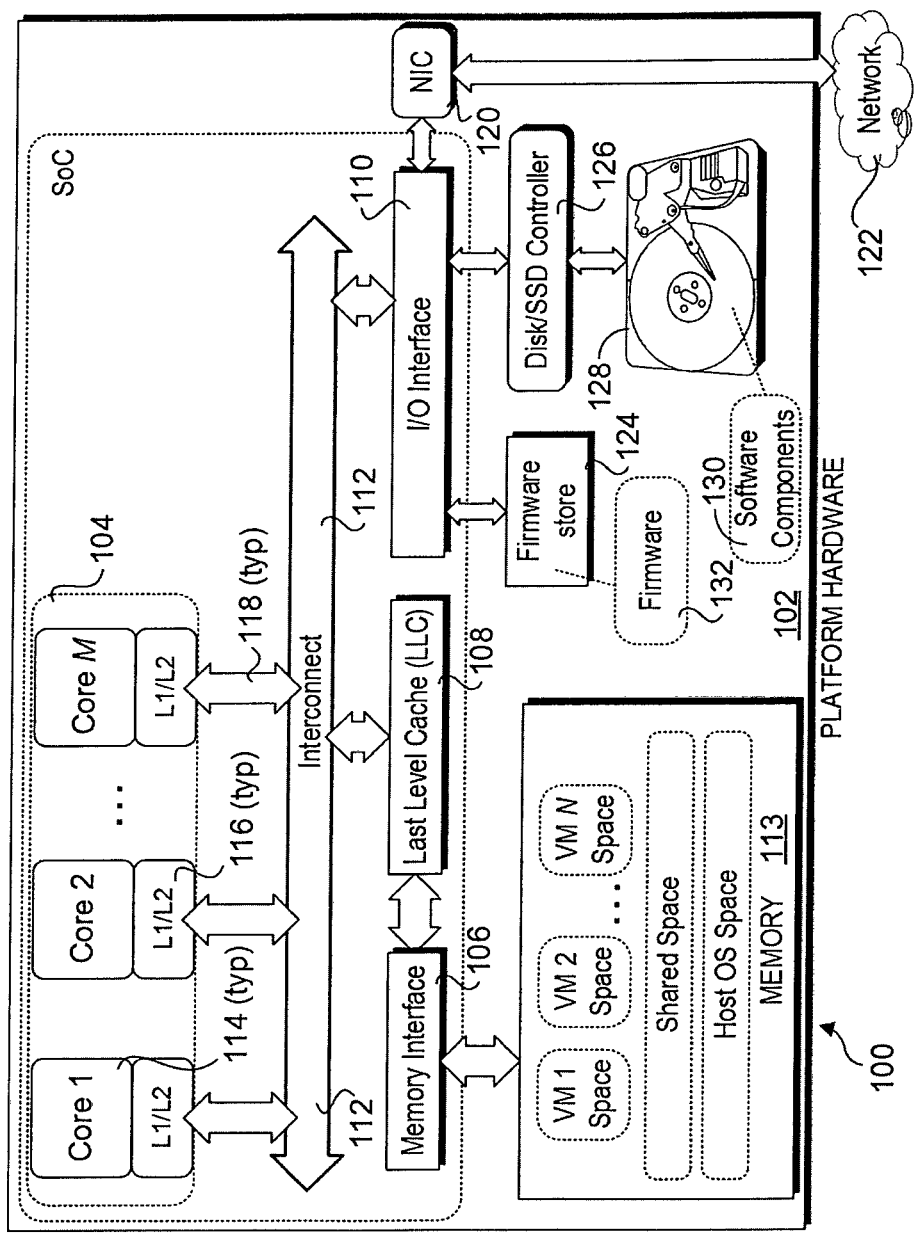
FIG. 1 is a schematic diagram illustrating an exemplary configuration of host platform.

Embodiments implementing method and apparatus for smart store operations utilizing conditional ownership requests are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

Aspects of the present invention provide new hardware support at the caching level to ensure that a request for cache line ownership is only issued if part of the cache line differs from a specific value. Another aspect of the invention proposes new instructions, for example, a scalar instruction and a vector instruction, to access the capability of conditional store based on the new hardware support. According to an embodiment, an extension is added to existing cache coherency protocol for performing a conditional store scheme. By offloading the check for unnecessary stores to hardware, the invention described herein reduces unnecessary read for ownership and request for ownership messages as well as data movement between core caches to improve performance, without adding overhead to the programmers. It also preserves the simplicity of the code by not explicitly adding conditional predicates to the code. This avoids both an increase to the code size as well as potential impairments to the ability for compliers to analyze and perform code optimizations, such as vectorization and loop-invariant code motion. By eliminating the need for a conditional predicate before every store, the present invention also does not pollute or rely on the branch prediction mechanism. In one aspect, the use of existing store instruction is preserved because every store becomes a conditional store. According to an embodiment, a conditional read for ownership operation replaces the traditional read for ownership operation and is issued for every store instruction. In another embodiment, new instructions are exposed to the software stack to specify the use of conditional read for ownership operation instead of the traditional read for ownership or request for ownership operations. The following illustrates exemplary embodiments of these new the instructions:

CondScalarStore @Line, New Value, Offset
CondVectorStore @Line, New Value, Offset Each of these new instructions includes three operands. The @Line operand corresponds to the memory address of the cache line (i.e. target cache line) in which a new value is to be stored. The New Value operand corresponds to the value to be stored into the target cache line. The Offset operand provides an offset into the target cache line for locating a value with which the new value is compared. As will be described below, these new instructions will generate a request for ownership for the targeted cache line @Line only if the memory address+offset value is different form the new value. With respect to the CondVectorStore instruction, the three operands (i.e., @Line, New Value, and Offset) are vector registers each containing multiple cache line addresses, new values, and offsets as vectorized data elements. For instance, the @Line operand may be a 512-bit vector register comprising eight 64-bit cache line addresses. The New Value operand may be a 256-bit vector register comprising eight 32-bit values to be stored into the eight cache lines identified by the @Line operand. The Offset operand may be a 64-bit vector register comprising eight 8-bit offsets. CondVectorStore enables conditional store of multiple values into one or more cache lines with a single instruction.

FIG. 1 shows an exemplary configuration of host platform according to an embodiment. Platform hardware 102 includes a central processing unit (CPU) 104 coupled to a memory interface 106, a last level cache (LLC) 108, and an input/output (I/O) interface 110 via an interconnect 112. The LLC may optionally be referred to as Level 3 (L3) cache. In some embodiments, all or a portion of the foregoing components may be integrated on a System on a Chip (SoC). Memory interface 106 is configured to facilitate access to system memory 113, which will usually be separate from the SoC.

CPU 104 includes a core portion including M processor cores 114, each including a local level 1 (L1) and level 2 (L2) cache 116. Optionally, the L2 cache may be referred to as a "middle-level cache" (MLC). Each of the L1, L2, and LLC caches is associated with one or more respective cache agents (not shown). As illustrated, each processor core 114 has a respective connection 118 to interconnect 112 and operates independently from the other processor cores.

For simplicity, interconnect 112 is shown as a single double-ended arrow representing a single interconnect structure; however, in practice, interconnect 112 is illustrative of one or more interconnect structures within a processor or SoC, and may comprise a hierarchy of interconnect segments or domains employing separate protocols and including applicable bridges for interfacing between the interconnect segments/domains. For example, the portion of an interconnect hierarchy to which memory and processor cores are connected may comprise a coherent memory domain employing a first protocol, while interconnects at a lower level in the hierarchy will generally be used for I/O access and employ non-coherent domains. The interconnect structure on the processor or SoC may include any existing interconnect structure, such as buses and single or multi-lane serial point-to-point, ring, or mesh interconnect structures.

I/O interface 110 is illustrative of various I/O interfaces provided by platform hardware 102. Generally, I/O interface 110 may be implemented as a discrete component (such as an ICH (I/O controller hub) or the like), or it may be implemented on an SoC. Moreover, I/O interface 110 may also be implemented as an I/O hierarchy, such as a Peripheral Component Interconnect Express (PCIe™) I/O hierarchy. I/O interface 110 further facilitates communication between various I/O resources and devices and other platform components. These include a Network Interface Controller (NIC) 120 that is configured to facilitate access to a network 122, and various other I/O devices, which include a firmware store 124, a disk/SSD controller 126, and a disk drive 128. More generally, disk drive 128 is representative of various types of non-volatile storage devices, including both magnetic- and optical-based storage devices, as well as solid-state storage devices, such as solid state drives (SSDs) or Flash memory.

The multiple cores 114 of CPU 104 are employed to execute various software components 130, such as modules and applications, which are stored in one or more non-volatile storage devices, such as depicted by disk drive 128. Optionally, all or a portion of software components 130 may be stored on one or more storage devices (not shown) that are accessed via a network 122

During boot up or run-time operations, various software components 130 and firmware 132 are loaded into system memory 113 and executed on cores 114 as processes comprising execution threads or the like. Depending on the particular processor or SoC architecture, a given "physical" core may be implemented as one or more logical cores, with processes being allocated to the various logical cores. For example, under the Intel® Hyperthreading™ architecture, each physical core is implemented as two logical cores. Under a typical system boot for platform hardware 102, firmware 132 will be loaded and configured in system memory 113, followed by booting a host operating system (OS).

Figure 2:
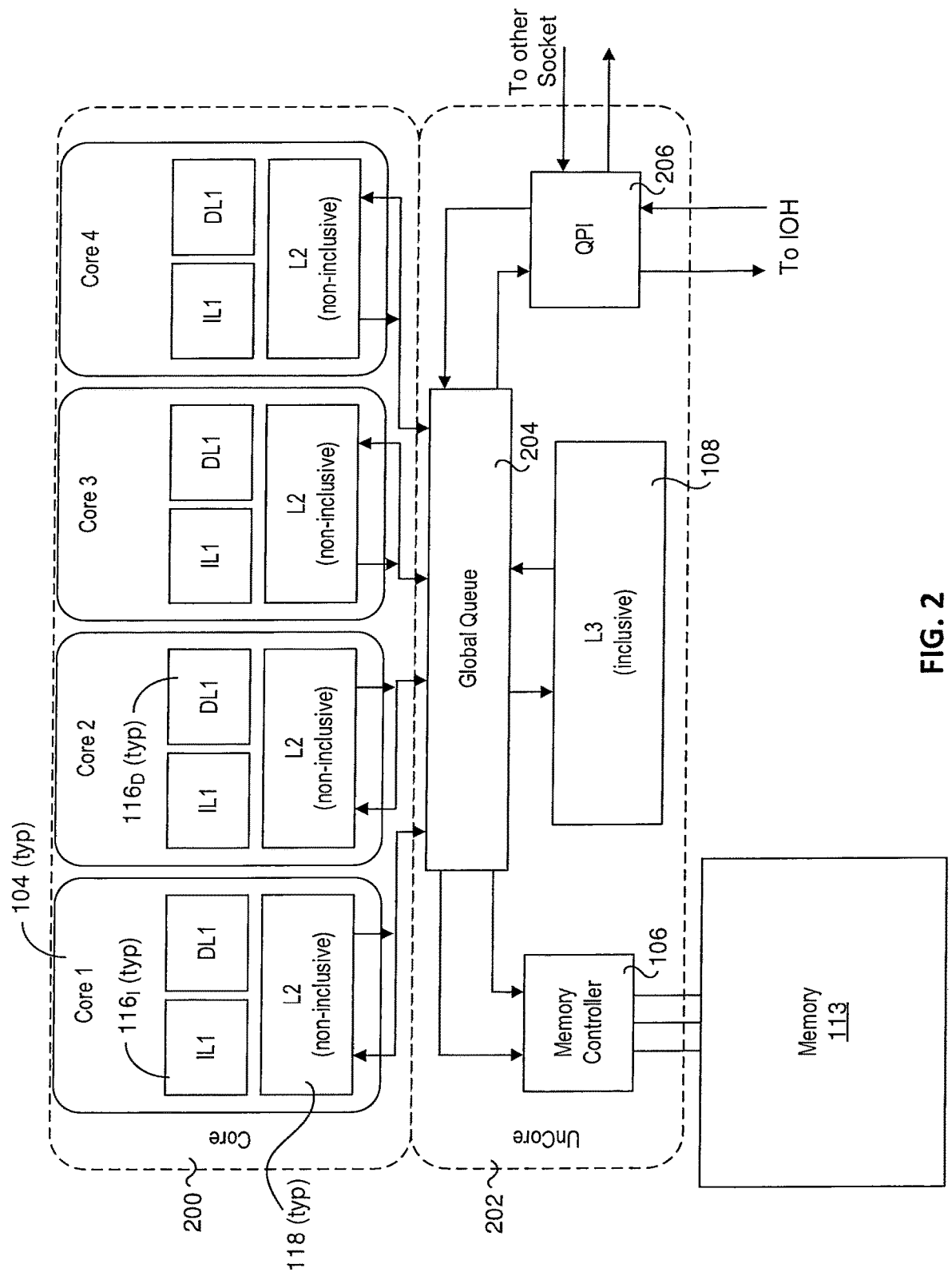
FIG. 2 is a schematic diagram illustrating an abstracted view of a memory coherency architecture employed by the platform shown in FIG. 1.

FIG. 2 shows an abstracted view of a memory coherency architecture employed by the embodiment of FIG. 1. Under this and similar architectures, such as employed by many Intel® processors, the L1 and L2 caches are part of a coherent memory domain under which memory coherency is managed by coherency mechanisms in the processor core 200. Each core 104 includes a L1 instruction (IL1) cache 116$_I$, and L1 data cache (DL1) 116$_D$, and an L2 cache 118. Each of these caches is associated with a respective cache agent (not shown) that makes up part of the coherency mechanism. L2 caches 118 are depicted as non-inclusive, meaning they do not include copies of any cache lines in the L1 instruction and data caches for their respective cores. As an option, L2 may be inclusive of L1, or may be partially inclusive of L1. In addition, L3, also known as LLC, may be non-inclusive of L2. As yet another option, L1 and L2 may be replaced by a cache occupying a single level in cache hierarchy.

The LLC is considered part of the "uncore" 202, wherein memory coherency is extended through coherency agents, resulting in additional overhead and processor cycles. As shown, uncore 202 includes memory controller 106 coupled to external memory 113 and a global queue 204. Global queue 204 also is coupled to an L3 cache 108, and a QuickPath Interconnect® (QPI) interface 206. Optionally, interface 206 may comprise a Keizer Technology Interface (KTI). L3 cache 108 (which functions as the LLC in this architecture) is inclusive, meaning that it includes is a copy of each cache line in the L1 and L2 caches. As is well known, as one gets further away from a core, the size of the cache levels increase. However, as the cache size increase, so does the latency incurred in accessing cache lines in the caches. The L1 caches are the smallest (e.g., 32-64 Kilo-Bytes (KB)), with L2 caches being somewhat larger (e.g., 256-640 KB), and LLCs being larger than the typical L2 cache by an order of magnitude or so (e.g., 8-16 MB). Nonetheless, the size of these caches is dwarfed when compared to the size of system memory, which is typically on the order of GigaBytes. Generally, the size of a cache line at a given level in a memory hierarchy is consistent across the memory hierarchy, and for simplicity and historical references, lines of memory in system memory are also referred to as cache lines even though they are not actually in a cache. It is further noted that the size of global queue 204 is quite small, as it is designed to only momentarily buffer cache lines that are being transferred between the various caches, memory controller 106, and QPI interface 206.

Figure 3:
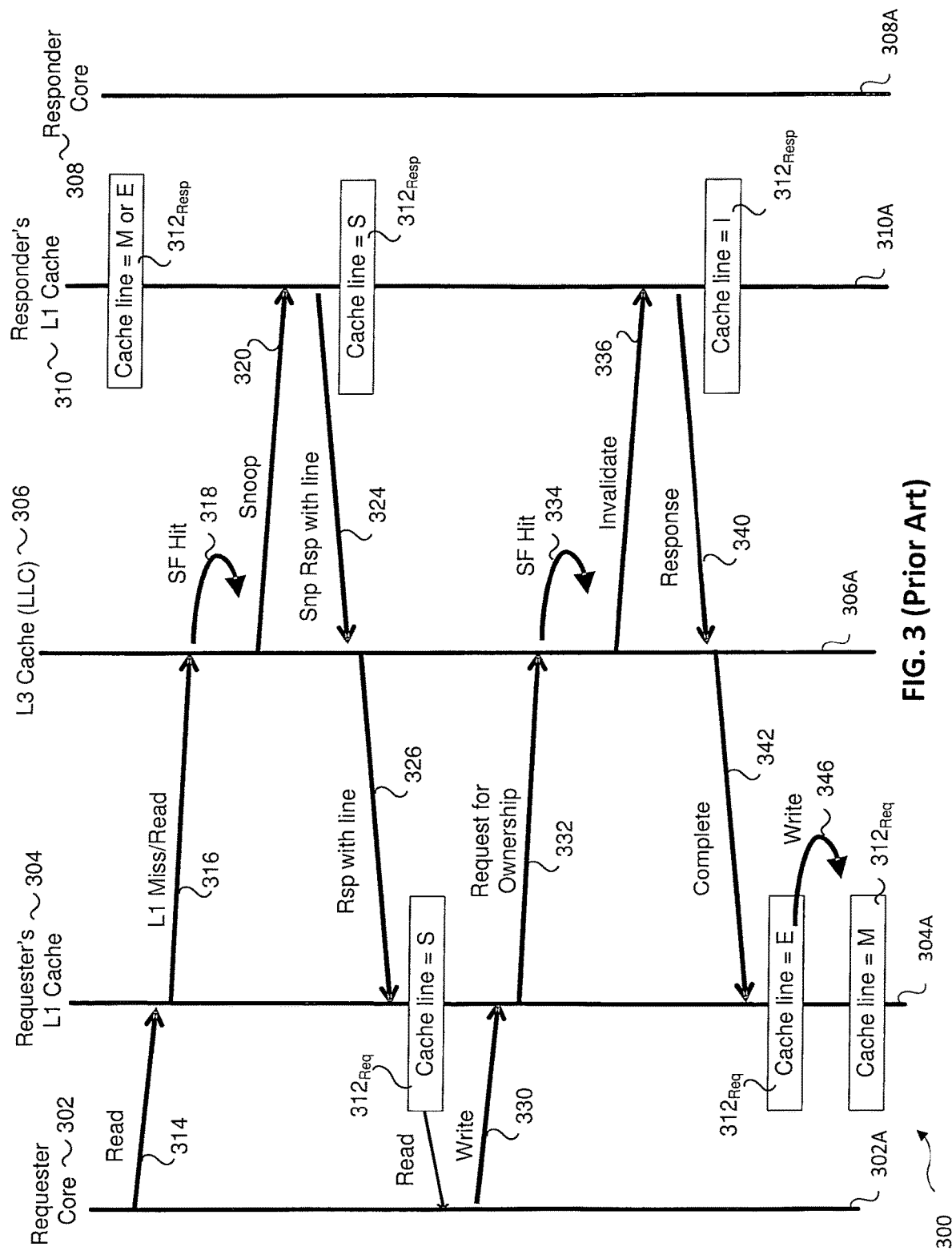
FIG. 3 is a message flow diagram illustrating a typical memory read/write access sequence using a combination of read and request for ownership operations, under a conventional approach.

FIG. 3 illustrates a typical memory read/write access sequence using a combination of read and request for ownership operations. In FIG. 3, the message flow diagram 300 is implemented on a multi-core processor platform comprising a requester core 302 that includes a requester's L1 cache 304, a responder core 308 that includes a responder's L1 cache 310, and an L3 cache (e.g., LLC) 306. Each of these components has a respective agent, as depicted by agents 302A, 304A, 306A, 308A, and 310A. It is worth noting that L2 caches are not shown in FIG. 3 because in this example, the L 1 and L2 caches are non-inclusive and the copies of the cache line are in the L1 caches. Also, details regarding cache lines within the L3 cache is omitted from FIG. 3 to avoid obscuring the underlying discussion. The same omissions also apply to the memory access sequence illustrated in FIGS. 4-6.

At initial state, cache line 312 (i.e., the target cache line) in FIG. 3 is cached in responder's L1 cache 310 and marked as either (M)odified or (E)xclusive. The cache line as it is stored in the responder's L1 cache is denoted as 312$_{Resp}$. A requester core 302 desires to read cache line 312. To obtain a copy of cache line 312, the requester core's agent 302A sends a read request 314 to agent 304A for requester's L1 cache 304. Since requester's L1 cache does not contain a copy of cache line 312, it results in an L1 miss and agent 304A forwards the read request 316 to agent 306A for L3 cache 306. Responsive to receiving the read request 316, agent 306A access its snoop filter and detects responder's L1 cache 310 has the desired target cache line 312. Accordingly, agent 306A sends a snoop request 320 to agent 310A for the responder's L1 cache 310. In response to receiving the snoop request 320, Agent 310A sets its copy of the cache line 312$_{Resp}$ to (S)hared state and sends a snoop response 324 containing a copy of cache line 312 to agent 306A. Agent 306A in turn forwards cache line 312 in a response 326 back to agent 304A for the requester's L1 cache. Agent 304A caches cache line 312$_{Req}$ in the requester's L1 cache to be read by the requester core 302.

Thereafter, requester core 302 wishes modify its copy of the cache line 312$_{Req}$ via a write 330. However, in order to write to cache line $312_{Req}$, requester core 302 must first establish ownership of the cache line 312 by invalidating all other copies of cache line 312 that exist in other cores. To do so, agent 304A for the requester's L1 cache sends a Request For Ownership message 332 to agent 306A for L3 cache 306. In response to receiving the Request for Ownership message 332 and determining a hit 334 in its snoop filter, agent 306A sends an invalidate message 336 to the responder's L1 cache agent 310A. Upon receipt of invalidate message 336, agent 310A marks its copy of cache line $312_{Resp}$ as (I)nvalid and returns a response 340 to the agent 306A for L3 cache 306. Agent 306A in turn returns a complete message 342 to agent 304A for requester's L1 cache 304. Upon receipt of the complete message, indicating that the requester core is the sole owner of cache line 312, its copy of the cache line $312_{Req}$ is marked as (E)xclusive. Data is then written to cache line $312_{Req}$ (as depicted by a Write 346), and cache line $312_{Req}$ is marked as (M)odified. Agent 304A then returns a complete message (not shown) to requester core's agent 302A signifying conclusion of the write operation.

Figure 4:
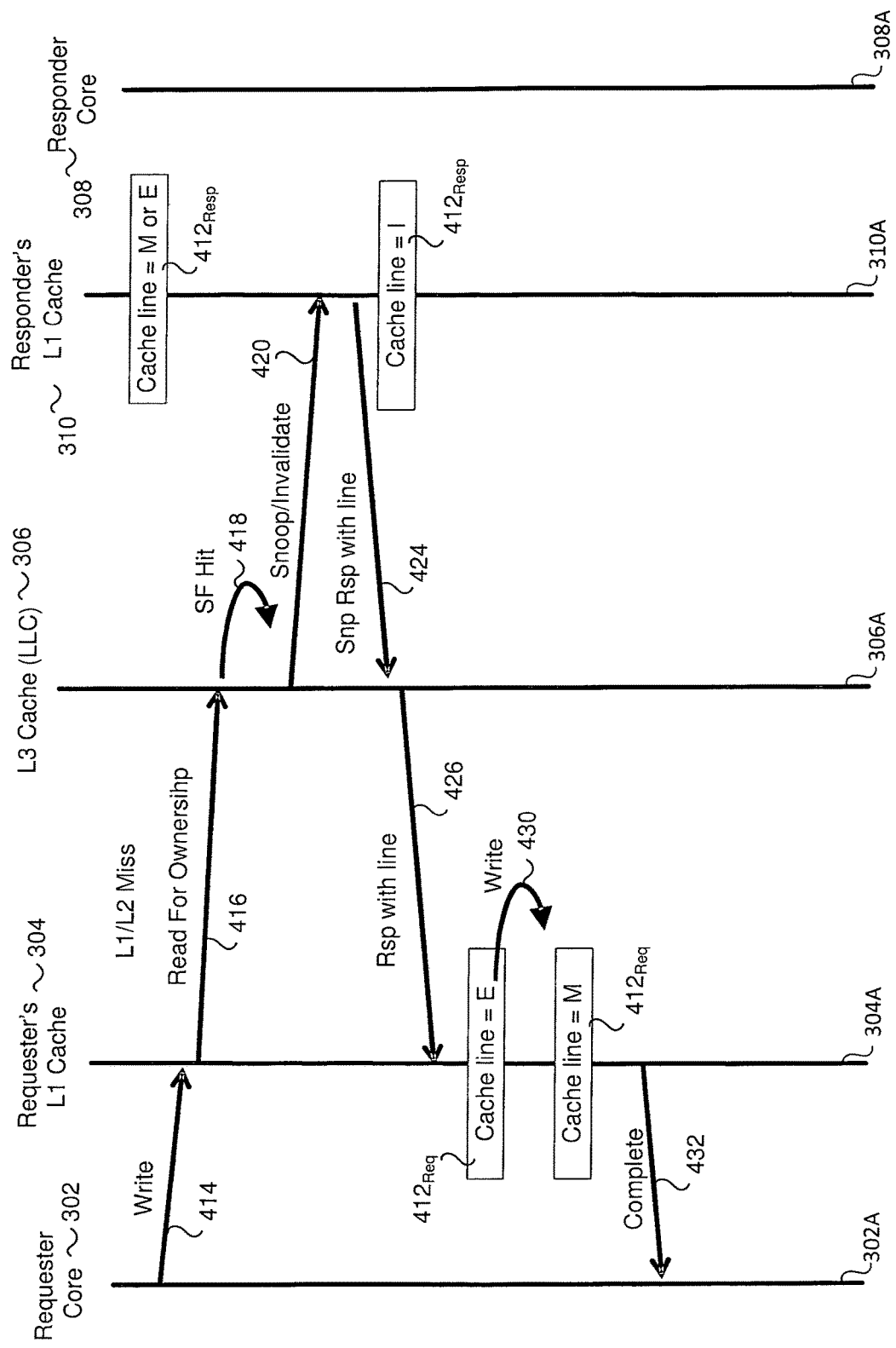
FIG. 4 is a message flow diagram illustrating a typical memory read/write access sequence using a read for ownership operation that combines a read and an invalidate broadcast, under a conventional approach.

FIG. 4 illustrates a memory read/write access sequence utilizing a read for ownership operation that combines a read and an invalidate broadcast. The message flow diagram 400 is implemented on a multi-core processor platform similar that of message flow diagram 300 of FIG. 3. To simplify the discussion, same notations will be used for the requester core, responder core, L3 cache, as well as their respective agents.

At initial state, cache line 412 (i.e., the target cache line) is cached in responder's L1 cache 410 and marked as either (M)odified or (E)xclusive. The cache line as it is stored in the responder's L1 cache is denoted as $412_{Resp}$. A requester core 302 wishes perform a write 414 to cache line 412 which is not in the requester's L1 cache 304. To obtain a copy of cache line 412 as well as establishing ownership at the same time, agent 304A for requester's L1 cache 304 sends a read for ownership message 416 to agent 306A for the L3 cache 306. Responsive to receiving the read request 316, agent 306A access its snoop filter and detects responder's L1 cache 310 has the desired target cache line 412. Accordingly, agent 306A sends a snoop/invalidate request 420 to agent 310A for the responder's L1 cache 310. In response to receiving snoop/invalidate request 420, Agent 310A sets its copy of the cache line $412_{Resp}$ to (I)nvalidate state and sends a snoop response 424 with a copy of cache line 412 marked (E)xclusive to agent 306A. Agent 306A in turn forwards cache line 412 in a response 426 back to agent 304A for the requester's L1 cache. Agent 304A caches cache line $412_{Req}$ in the requester's L1 cache. Data is then written to cache line $412_{Req}$ (as depicted by a Write 430), and cache line $412_{Req}$ is marked as (M)odified. Agent 304A then returns a complete message 432 to requester core's agent 302A signifying conclusion of the write operation.

Figure 5:
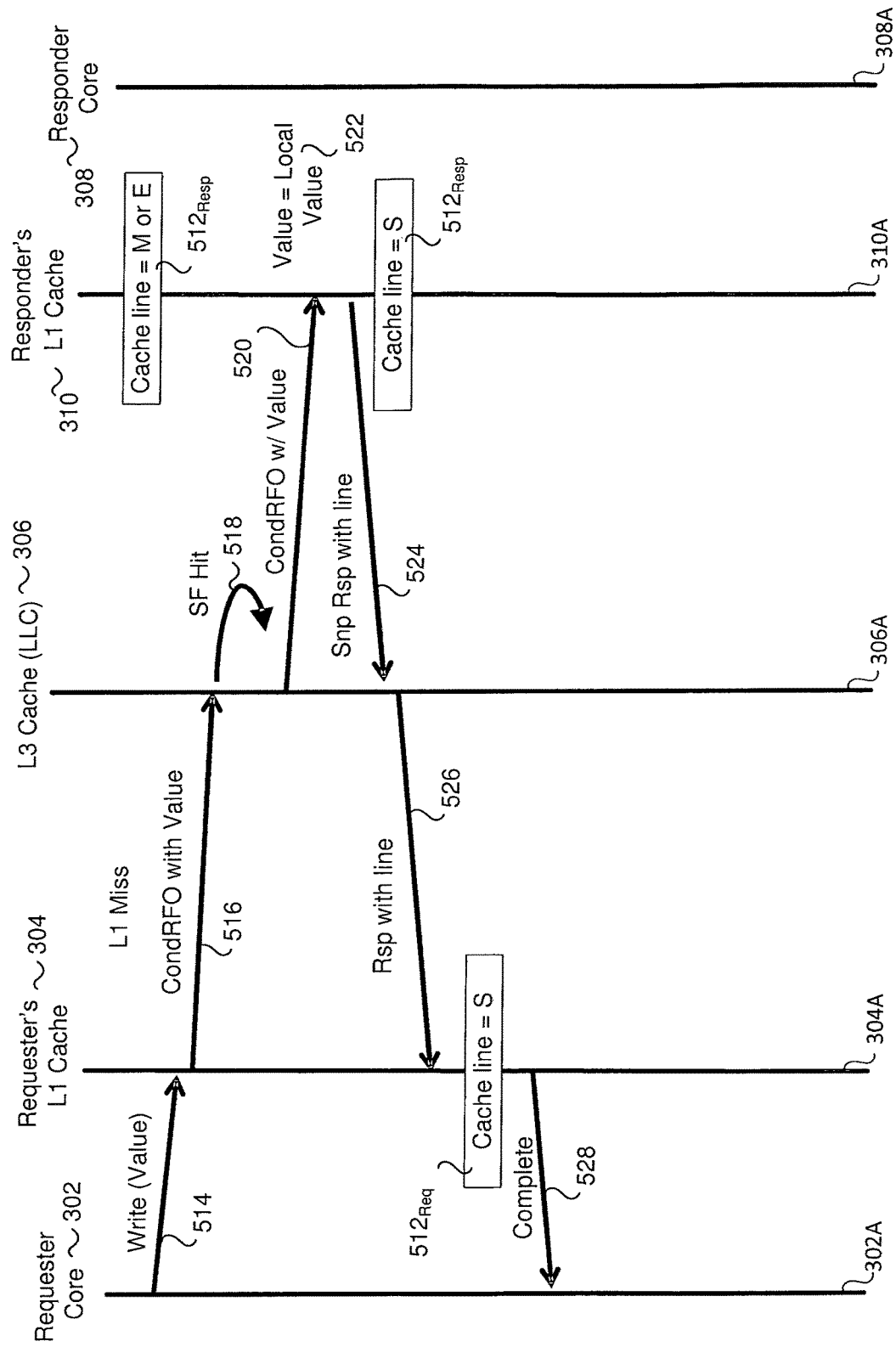
FIG. 5 is a message flow diagram illustrating a memory read/write access sequence utilizing a conditional read for ownership operations according to an embodiment of the present invention, where the stored value is the same as the value to be written.
Figure 6:
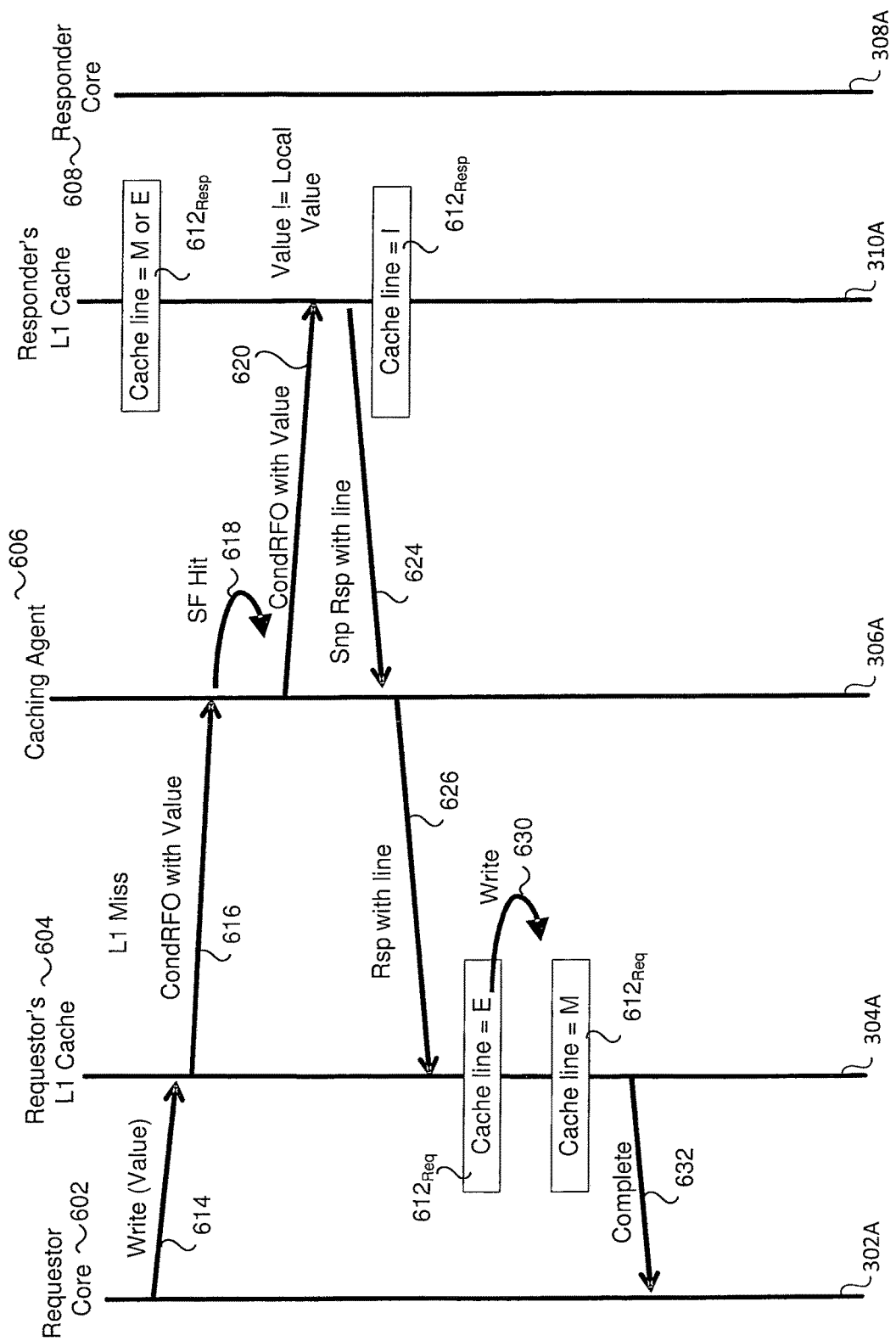
FIG. 6 is another message flow diagram illustrating a memory read/write access sequence utilizing a conditional read for ownership operations according to an embodiment of the present invention, where the stored value is different than the value to be written.

As illustrated by FIGS. 3 and 4, the copy of the target cache line in responder's L1 cache is invalidated by a read for ownership or request for ownership operation regardless of whether the invalidation is justified. As discussed above, if a value to be written into a target cache line is not different than the value that is already stored at that cache line, the performance of such write request would not only be redundant and unnecessary, but also tend to cause cache line invalidations in other cores that can potentially lead to an undesirable ping pong trail of ownership requests and snoop messages. FIGS. 5 and 6 illustrate embodiments of the present invention utilizing a conditional read for ownership operation that prevents unnecessary cache line invalidations by only invalidating a cache line when actual modification to the cache line is going to be made. FIG. 5 illustrates the memory message flow when the value to be written into the cache line is the same as the value that is currently stored. In this case, the conditional read for ownership behaves like an ordinary read operation with no invalidation made to the cache line. At initial state, cache line 512 (i.e., the target cache line) is cached in responder's L1 cache 310 and marked as either (M)odified or (E)xclusive. The cache line as it is stored in the responder's L1 cache is denoted as $512_{Resp}$. A requester core 302 wants to write 504 a value to cache line 512. This time, instead of separate read and request for ownership messages, or a single read for ownership message, agent 304A for requester's L1 cache 304 sends agent 306A a conditional read for ownership (CondRFO) message 516 along with the value to be written into the target cache line. Responsive to receiving the CondRFO message 3R16, agent 306A access its snoop filter and detects responder's L1 cache 310 has the desired target cache line 512. Agent 306A then forwards the CondRFO message along with the value 520 to agent 310A for the responder's L1 cache 310. Upon receiving the CondRFO message 420, agent 310A compares 522 the current value (i.e., local value) in its cache line $512_{Resp}$ with the value to be written, and finds that the two values are the same. This results of this check indicates that a write to the cache line is not necessary and should not be performed. Consequently, there would be no need for agent 310A to invalidate its cache line $512_{Resp}$. Instead, agent 310A sets cache line $512_{Resp}$ to (S)hared state and sends a response 524 containing a copy of cache line 512 to agent 306A. Agent 306A in turn forwards cache line 512 marked (S)hared in a response 526 back to agent 304A for the requester's L1 cache. Agent 304A caches cache line $512_{Req}$ in the requester's L1 cache to be available for future reads by the requester core 302. Agent 304A then returns a complete message 528 to requester core's agent 302A signifying conclusion of the write operation.

FIG. 6 illustrates a similar memory message flow as that of FIG. 5. However, this time, the value to be written is different than the value currently stored. The agent 310A for responder's L1 cache 310, upon determining that the value to be written into target cache line $612_{Resp}$ is different than the current value (i.e., local value) that is already stored there, invalidates cache line $612_{Resp}$. Agent 310A then sends a response 624 containing a copy of cache line 512 marked (E)xclusive to agent 306A. Agent 306A in turn forwards cache line 512 in a response 626 back to agent 304A for the requester's L1 cache. Agent 304A caches cache line $612_{Req}$ in the requester's L1 cache. The value is then written to cache line $612_{Req}$ (as depicted by a Write 630), and cache line $612_{Req}$ is marked as (M)odified. Agent 304A then returns a complete message 632 to requester core's agent 302A signifying conclusion of the write operation.

Figure 7:
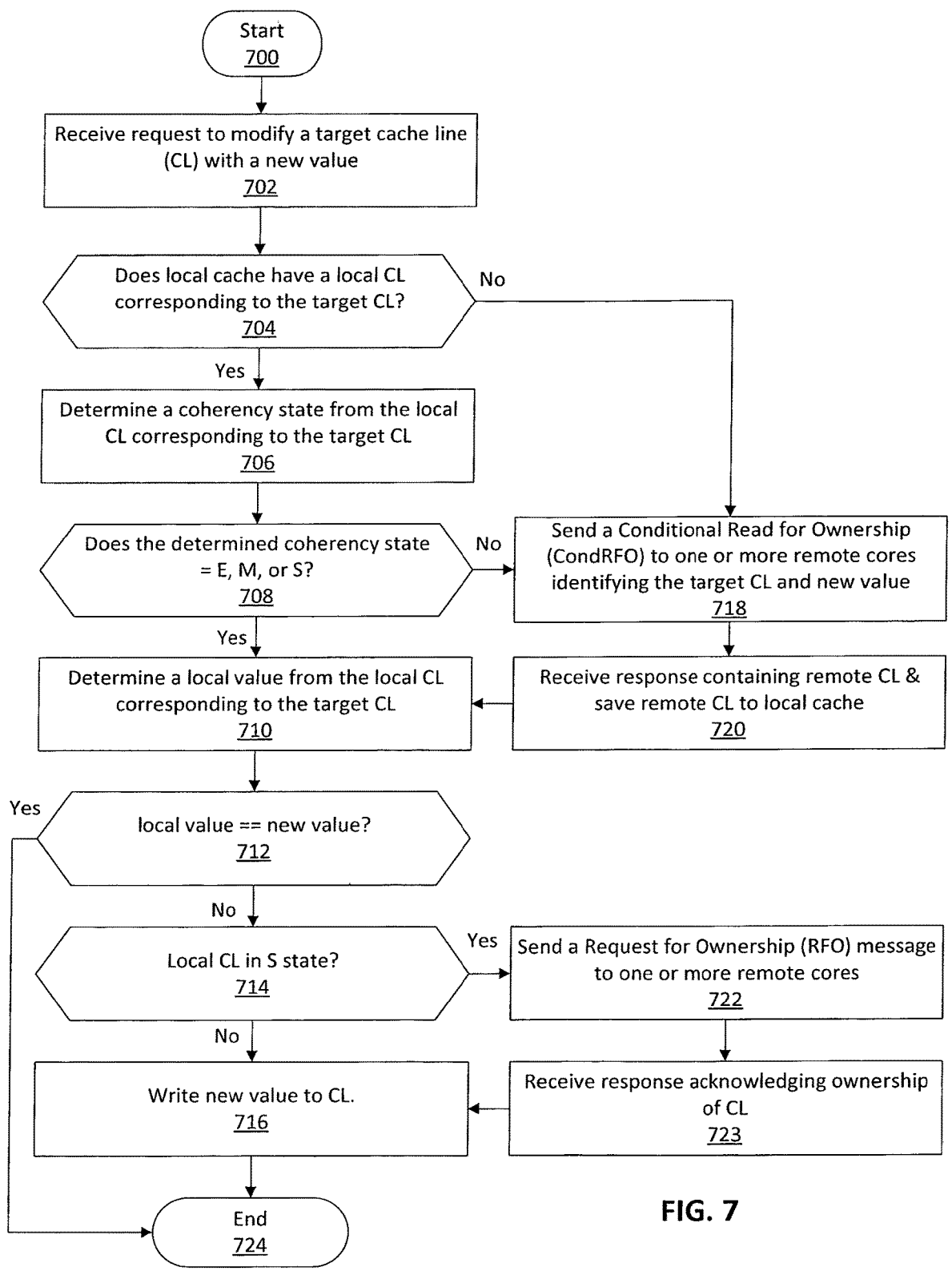
FIG. 7 is a flow diagram illustrating an embodiment of a method for handling requests to modify a cache line.

FIG. 7 is a flow diagram illustrating an embodiment of a method for handling a request to modify a cache line. The method applies to multi-core and multi-processor systems with coherent shared memory. While FIG. 7 focuses on the application of the method in a multi-core processor, the underlying concept is applicable to other shared memory systems. In one embodiment, the method is implemented in each core of a multi-core processor and is performed, for example, by the core's cache agent. The method beings at block 700. At block 702, a request to modify a target cache line (CL) with a new value is received. In one embodiment, the received request is generated in response to the execution of a store instruction, such as one of the new store instructions (e.g., CondScalarStore and CondVectorStore)

described above. According to an embodiment, the execution of CondVectorStore generates multiple requests where each request corresponds to a data element position of the vector registers identified by the instruction's operands. Each request identifies a target cache line and a new value to be written in to the target cache line. In some embodiments, the request further includes a cache line offset used to specify a location within a cache line. At block 704, a determination is made on whether a local cache contains a local cache line that corresponds to the target cache line identified by the received request. According to an embodiment, the determination involves a core's cache agent checking its caching table to see if there is a cache line entry matching the memory address contained in the received request. If the no such cache line entry exists in the caching table (i.e., a cache miss), a conditional read for ownership (CondRFO) message is sent or issued to one or more other cores in the multi-core processor system. According to an embodiment, the CondRFO message includes information obtained from the received request, such as information identifying the target cache line, as well as the new value to be stored and the cache line offset. At block 720, a response to the CondRFO is received from one of the one or more other cores. In one embodiment, the response received includes a copy of a cache line that corresponds to the target cache line in the CondRFO. This copy of the cache line is stored into the local cache and the method continues to block 704.

At block 704, if it is determined that the local cache contains a copy of the cache line corresponding to the target cache line in the received request, the method proceeds to block 706 and a coherency state of the cache line copy is determined. In one embodiment, the coherency state is one of the states in a cache or memory coherence protocol, such as the (M)odified, (E)xclusive, (S)hared, (I)nvalidate states of the MESI protocol. At block 708, a determination is made on whether the copy of the cache line corresponding to the target cache line is valid. According to an embodiment, this means the coherency state of the cache line copy is not marked (I)nvalid. In other words, whether the coherency state of the cache line is marked as one of valid states: (M)odified, (E)xclusive, or (S)hared. If the copy of the cache line is valid, then a local value is determined from the copy at block 710. On the other hand, if the copy of the cache line is not in one of the valid states, a CondRFO is sent out to one or more other cores in the multi-core processor system at block 718. At block 720, the core receives a response back for the CondRFO. The response will comprise a valid copy of the cache line marked as (E)xclusive. This received cache line is then saved to the local cache and the method continues to block 710.

At block 710, a local value is determined from the valid copy of the cache line in the local cache. According to an embodiment, the local value is obtained by applying the cache line offset to the cache line copy to identify a location within the cache line. A value is then read or extracted from the identified location. At block 712, the obtained local value is compared to the new value from the received request. If the values match, indicating that an update to the target cache line would be redundant and unnecessary, the process ends at block 724. However, if the local value does not match the new value, a write to the target cache line is required. At block 714, a determination is made on whether the core has ownership of the target cache line to be modified. According to an embodiment, this means determining whether coherency state of the cache line copy is (E)xclusive or (M)odified. If the core does not have ownership of the target cache line, such that the cache line copy is in (S)hared state, then at block 722 a request for ownership message is sent to one or more other cores. In another embodiment, instead of the regular request for ownership message, a CondRFO message described above may be issued. At bock 723, a response is received acknowledging the core's ownership of the cache line. Once ownership of the target cache line is established, either from the acknowledgement received at block 723 or based on the determination made at block 714, the cache agent stores the new value in the cache line at the location identified by the cache line offset, as illustrated by block 716. The process then ends at block 724.

An exemplary embodiment of the method described in FIG. 7, as implemented in a cache agent of a processor, includes the cache agent receiving a conditional read for ownership request from a requester in response to an execution of an instruction to modify a target cache line with a new value. The conditional read for ownership request identifies the target cache line and the new value. Then, the cache agent determines from its local cache a local cache line corresponding to the target cache line. Next, the cache agent determines a local value from the local cache line and compares the local value with the new value. Based on the result of the comparison, the cache agent either sets the coherency state of the local cache line to a (S)hared state when the local value is the same as the new value, or sets the coherent state of the local cache line to (I)nvalid when the value is different from the new value. In addition, the cache agent also sends a response back to the requester, the response comprises a copy of the local cache line. According to an embodiment, the coherency state of the copy of the local cache line sent back to the request is set to (S)hare when the local value is the same as the new value, and to (E)xclusive when the local value is different from the new value. In an embodiment, the conditional read for ownership request includes a memory address to identify a target cache line and a cache line offset to be used to determine a local value in a local cache. To determine a local value from a local cache line, a location in the local cache line is first identified based on the cache line offset and then a value is read from the identified location.

Figure 8:
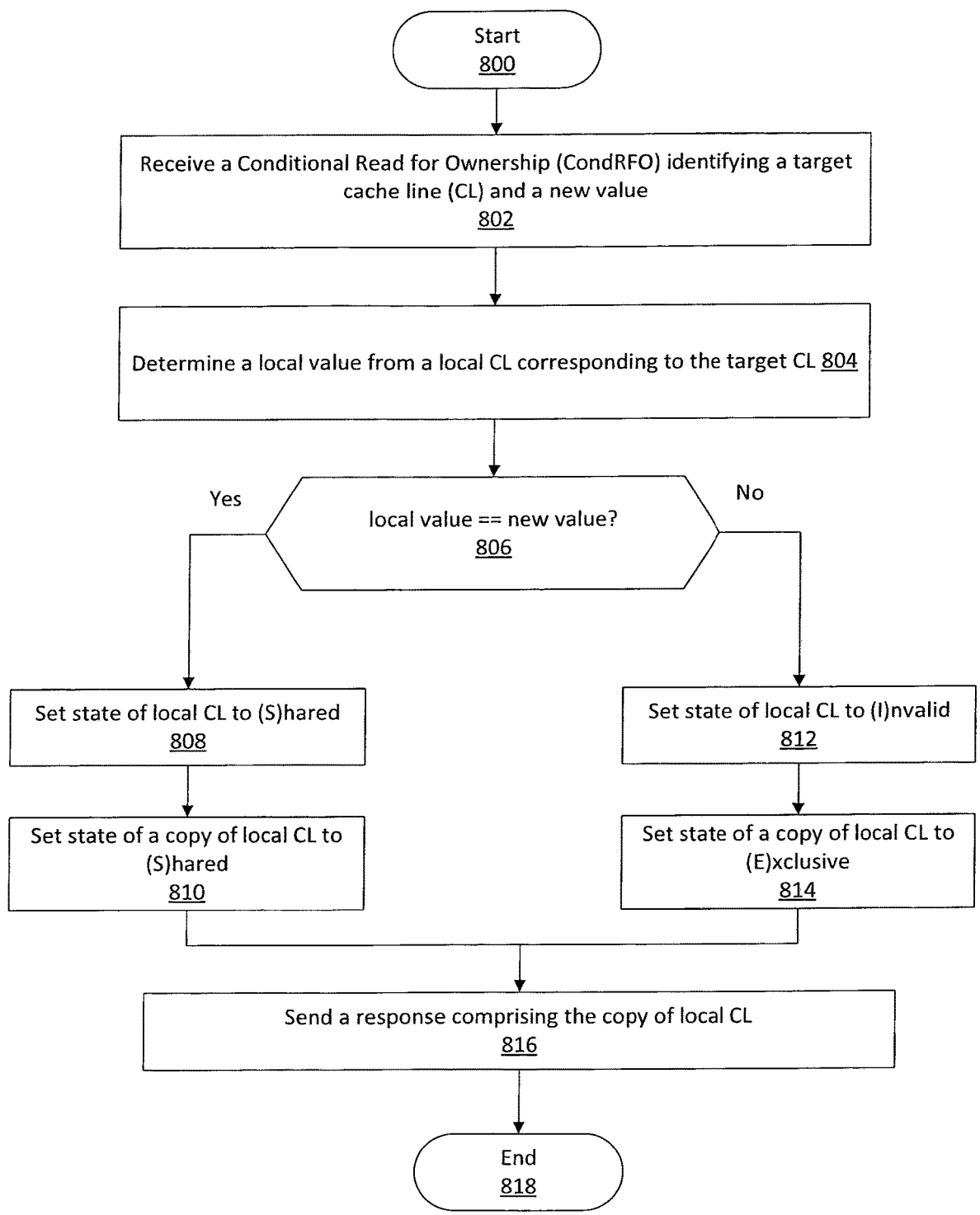
FIG. 8 is a flow diagram illustrating a method for handling conditional read for ownership (CondRFO) requests according to an embodiment of the present invention.

FIG. 8 is a flow diagram illustrating one embodiment of a method for handling a conditional read for ownership (CondRFO) request. As with the method illustrated in FIG. 7, this method applies to multi-core and multi-processor systems with coherent shared memory. While the method of FIG. 8 focuses on the application of the method in a multi-core processor, the underlying concept is applicable to other shared memory systems. The method is implemented in each core of a multi-core processor and is performed, for example, by the core's cache agent. The method begins with block 800. At block 802, a core or the core's cache agent in the multi-core processor system receives a conditional read for ownership (CondRFO) message from another core. The CondRFO message identifies a target cache line and a new value. A target cache line is typically identified by a memory address. In some embodiments, the CondRFO message further comprises a cache line offset. Referring to block 804, responsive to receiving the CondRFO, the core's cache agent determines a local value from a local cache line corresponding to the target cache line. According to an embodiment, the determination involves a core's cache agent checking its caching table to see if there is a cache line entry matching the target cache line from the CondRFO. If so, the offset specified in the CondRFO is applied to the local cache line to identify a location within the local cache line.

A local value is then extracted or read from the identified location. At block 806, a comparison is made between the local value and the new value supplied by the CondRFO. If the values match, the coherency state of the local cache line is set to (S)hared at block 808. At block 810, a response message containing a copy of the local cache line is generated. The coherency state of the local cache line copy is set to (S)hared. At block 816, the response message along with the local cache line copy is sent to the sender of the CondRFO message. On the other hand, if back at block 806 the comparison between the local value and the new value reveals that the values are not the same indicating that a cache line modification is necessary, the coherency state of the local cache line is set to (I)nvalid at block 812. At block 814, a response message containing a copy of the local cache line is generated. The coherency state of the local cache line copy is set to (E)xclusive. At block 816, the response message along with the local cache line copy is sent to the sender of the CondRFO message. The process ends at block 818.

An exemplary embodiment of the method described in FIG. 8, as implemented in a multi-core processor, includes a decoder circuit decoding a conditional store instruction followed by an execution circuit executing the decoded conditional store instruction to modify a target cache line with a new value. A cache agent of the processor determines if its local cache contains a valid local cache line corresponding to the target cache line. Responsive to a determination that the local cache does not contain a valid local cache line that corresponds to the target cache line, the cache agent sends a conditional read for ownership request to one or more other cores in the processor. The conditional read for ownership request identifies the target cache line and the new value. According to an embodiment, responsive to a determination that the local cache does contain a valid local cache line corresponding to the target cache line, the cache agent then determines a local value from the valid local cache line and compares the local value with the new value. If the local value is different from the new value, the cache agent nest determines the coherency state of the valid local cache line. In an embodiment, the coherency state of a valid local cache line may be one of (M)odified, (E)xclusive, or (S)hared. Based on the determined coherency state, the cache agent either writes the new value to the valid local cache line if the determined coherency state is (S)hared, or sends a request for ownership to one or more other cores of the multi-core processor if the determined coherency state is not (S)hared. According to an embodiment, the conditional read for ownership request includes a memory address to identify a target cache line and a cache line offset. The cache line offset is used identify a remote value in a remote CL on another core of the multi-core processor. The identified remote value is to be compared with the new value.

Figure 9:
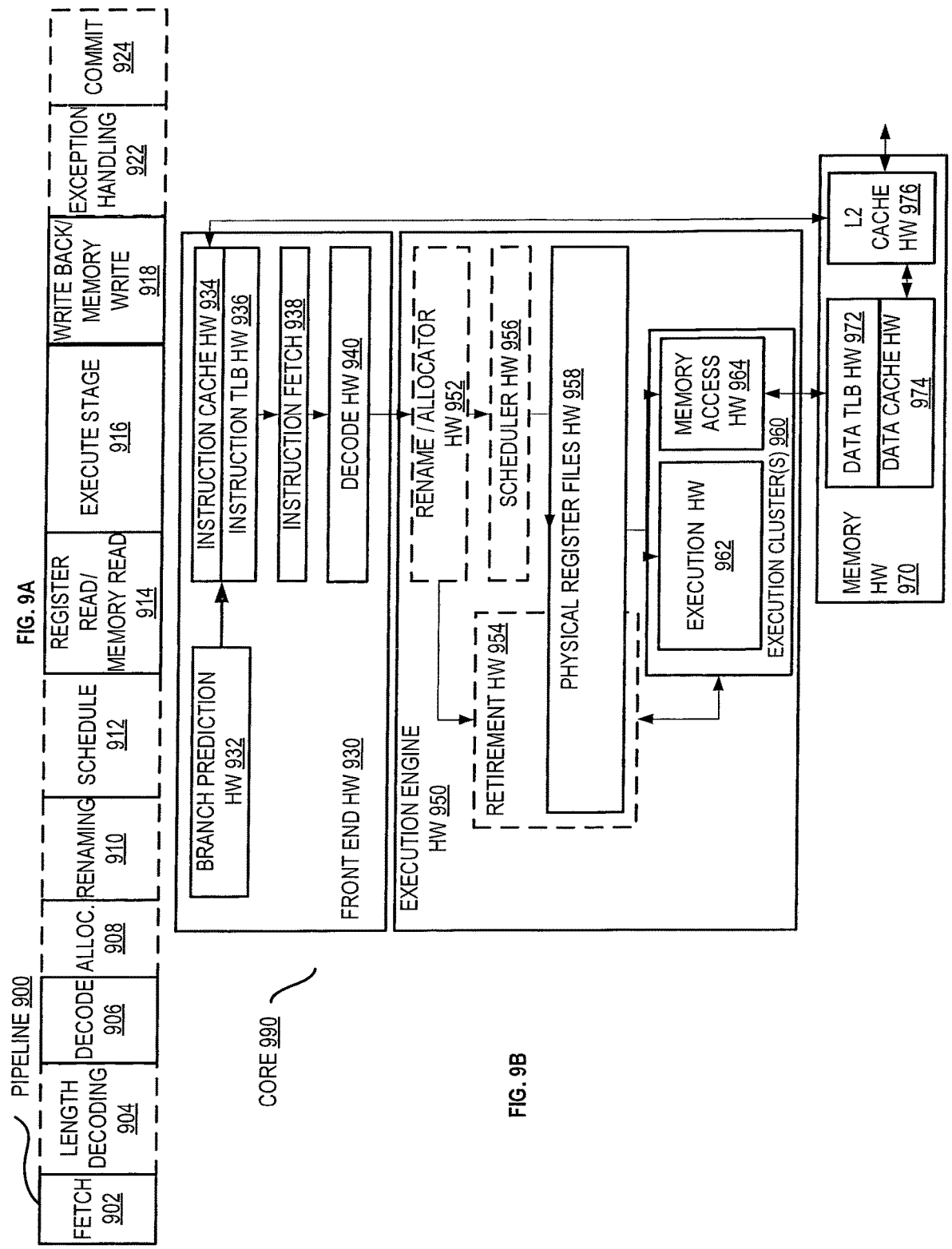
FIG. 9A is a block diagram illustrating both an exemplary in-order pipeline and an exemplary register renaming, out-of-order issue/execution pipeline according to embodiments of the invention.
FIG. 9B is a block diagram illustrating both an exemplary embodiment of an in-order architecture core and an exemplary register renaming, out-of-order issue/execution architecture core to be included in a processor according to embodiments of the invention.

FIG. 9A is a block diagram illustrating both an exemplary in-order pipeline and an exemplary register renaming, out-of-order issue/execution pipeline according to embodiments of the invention. FIG. 9B is a block diagram illustrating both an exemplary embodiment of an in-order architecture core and an exemplary register renaming, out-of-order issue/execution architecture core to be included in a processor according to embodiments of the invention. The solid lined boxes in FIGS. 9A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 9A, a processor pipeline 900 includes a fetch stage 902, a length decode stage 904, a decode stage 906, an allocation stage 908, a renaming stage 910, a scheduling (also known as a dispatch or issue) stage 912, a register read/memory read stage 914, an execute stage 916, a write back/memory write stage 918, an exception handling stage 922, and a commit stage 924.

FIG. 9B shows processor core 990 including a front end hardware 930 coupled to an execution engine hardware 950, and both are coupled to a memory hardware 970. The core 990 may be a reduced instruction set computing (RISC) core, a complex instruction set computing (CISC) core, a very long instruction word (VLIW) core, or a hybrid or alternative core type. As yet another option, the core 990 may be a special-purpose core, such as, for example, a network or communication core, compression engine, coprocessor core, general purpose computing graphics processing unit (GPGPU) core, graphics core, or the like.

The front end hardware 930 includes a branch prediction hardware 932 coupled to an instruction cache hardware 934, which is coupled to an instruction translation lookaside buffer (TLB) 936, which is coupled to an instruction fetch hardware 938, which is coupled to a decode hardware 940. The decode hardware 940 (or decoder) may decode instructions, and generate as an output one or more micro-operations, micro-code entry points, microinstructions, other instructions, or other control signals, which are decoded from, or which otherwise reflect, or are derived from, the original instructions. The decode hardware 940 may be implemented using various different mechanisms. Examples of suitable mechanisms include, but are not limited to, look-up tables, hardware implementations, programmable logic arrays (PLAs), microcode read only memories (ROMs), etc. In one embodiment, the core 990 includes a microcode ROM or other medium that stores microcode for certain macroinstructions (e.g., in decode hardware 940 or otherwise within the front end hardware 930). The decode hardware 940 is coupled to a rename/allocator hardware 952 in the execution engine hardware 950.

The execution engine hardware 950 includes the rename/allocator hardware 952 coupled to a retirement hardware 954 and a set of one or more scheduler hardware 956. The scheduler hardware 956 represents any number of different schedulers, including reservations stations, central instruction window, etc. The scheduler hardware 956 is coupled to the physical register file(s) hardware 958. Each of the physical register file(s) hardware 958 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) hardware 958 comprises a vector registers hardware, a write mask registers hardware, and a scalar registers hardware. These register hardware may provide architectural vector registers, vector mask registers, and general purpose registers. The physical register file(s) hardware 958 is overlapped by the retirement hardware 954 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement hardware 954 and the physical register file(s) hardware 958 are coupled to the execution cluster(s) 960. The execution cluster(s) 960 includes a set of one or more execution hardware 962 and a set of one or more memory access hardware 964. The execution hardware 962 may perform various operations (e.g., shifts, addition, subtraction, multiplication) and on various types of data (e.g., scalar floating point, packed integer, packed floating point, vector integer, vector floating point). While some embodiments may include a number of execution hardware dedicated to specific functions or sets of functions, other embodiments may include only one execution hardware or multiple execution hardware that all perform all functions. The scheduler hardware 956, physical register file(s) hardware 958, and execution cluster(s) 960 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler hardware, physical register file(s) hardware, and/or execution cluster—and in the case of a separate memory access pipeline, certain embodiments are implemented in which only the execution cluster of this pipeline has the memory access hardware 964). It should also be understood that where separate pipelines are used, one or more of these pipelines may be out-of-order issue/execution and the rest in-order.

The set of memory access hardware 964 is coupled to the memory hardware 970, which includes a data TLB hardware 972 coupled to a data cache hardware 974 coupled to a level 2 (L2) cache hardware 976. In one exemplary embodiment, the memory access hardware 964 may include a load hardware, a store address hardware, and a store data hardware, each of which is coupled to the data TLB hardware 972 in the memory hardware 970. The instruction cache hardware 934 is further coupled to a level 2 (L2) cache hardware 976 in the memory hardware 970. The L2 cache hardware 976 is coupled to one or more other levels of cache and eventually to a main memory.

By way of example, the exemplary register renaming, out-of-order issue/execution core architecture may implement the pipeline 900 as follows: 1) the instruction fetch 938 performs the fetch and length decoding stages 902 and 904; 2) the decode hardware 940 performs the decode stage 906; 3) the rename/allocator hardware 952 performs the allocation stage 908 and renaming stage 910; 4) the scheduler hardware 956 performs the schedule stage 912; 5) the physical register file(s) hardware 958 and the memory hardware 970 perform the register read/memory read stage 914; the execution cluster 960 perform the execute stage 916; 6) the memory hardware 970 and the physical register file(s) hardware 958 perform the write back/memory write stage 918; 7) various hardware may be involved in the exception handling stage 922; and 8) the retirement hardware 954 and the physical register file(s) hardware 958 perform the commit stage 924.

The core 990 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 990 includes logic to support a packed data instruction set extension (e.g., AVX1, AVX2, and/or some form of the generic vector friendly instruction format (U=0 and/or U=1), described below), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache hardware 934/974 and a shared L2 cache hardware 976, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 10:
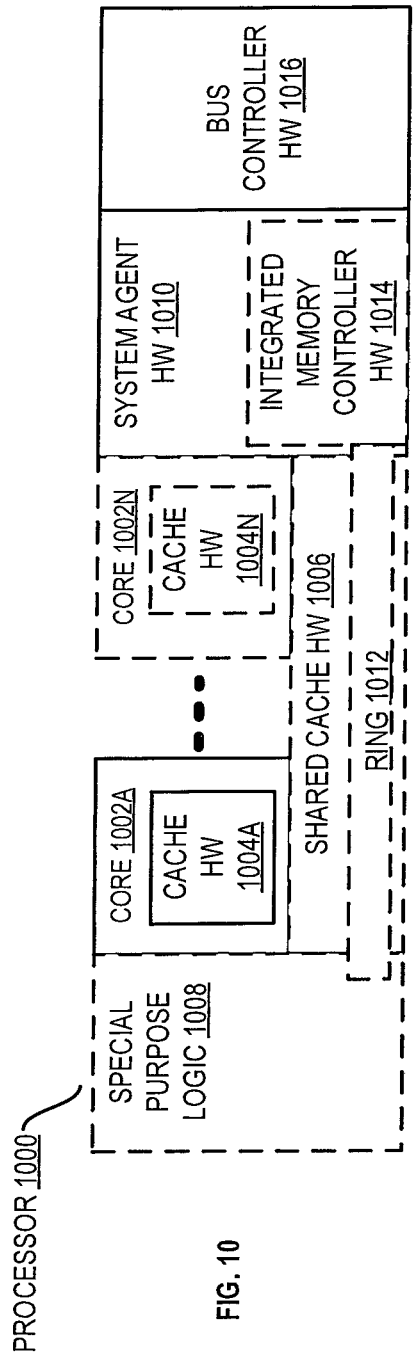
FIG. 10 is a block diagram of a single core processor and a multicore processor with integrated memory controller and graphics according to embodiments of the invention.

FIG. 10 is a block diagram of a processor 1000 that may have more than one core, may have an integrated memory controller, and may have integrated graphics according to embodiments of the invention. The solid lined boxes in FIG. 10 illustrate a processor 1000 with a single core 1002A, a system agent 1010, a set of one or more bus controller hardware 1016, while the optional addition of the dashed lined boxes illustrates an alternative processor 1000 with multiple cores 1002A-N, a set of one or more integrated memory controller hardware 1014 in the system agent hardware 1010, and special purpose logic 1008.

Thus, different implementations of the processor 1000 may include: 1) a CPU with the special purpose logic 1008 being integrated graphics and/or scientific (throughput) logic (which may include one or more cores), and the cores 1002A-N being one or more general purpose cores (e.g., general purpose in-order cores, general purpose out-of-order cores, a combination of the two); 2) a coprocessor with the cores 1002A-N being a large number of special purpose cores intended primarily for graphics and/or scientific (throughput); and 3) a coprocessor with the cores 1002A-N being a large number of general purpose in-order cores. Thus, the processor 1000 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1000 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache hardware 1006, and external memory (not shown) coupled to the set of integrated memory controller hardware 1014. The set of shared cache hardware 1006 may include one or more mid-level caches, such as level 2 (L2), level 3 (L3), level 4 (L4), or other levels of cache, a last level cache (LLC), and/or combinations thereof. While in one embodiment a ring based interconnect hardware 1012 interconnects the integrated graphics logic 1008, the set of shared cache hardware 1006, and the system agent hardware 1010/integrated memory controller hardware 1014, alternative embodiments may use any number of well-known techniques for interconnecting such hardware. In one embodiment, coherency is maintained between one or more cache hardware 1006 and cores 1002-A-N.

In some embodiments, one or more of the cores 1002A-N are capable of multithreading. The system agent 1010 includes those components coordinating and operating cores 1002A-N. The system agent hardware 1010 may include for example a power control unit (PCU) and a display hardware. The PCU may be or include logic and components needed for regulating the power state of the cores 1002A-N and the integrated graphics logic 1008. The display hardware is for driving one or more externally connected displays.

The cores 1002A-N may be homogenous or heterogeneous in terms of architecture instruction set; that is, two or more of the cores 1002A-N may be capable of execution the same instruction set, while others may be capable of executing only a subset of that instruction set or a different instruction set. In one embodiment, the cores 1002A-N are heterogeneous and include both the "small" cores and "big" cores described below.

FIGS. 11-14 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 11:
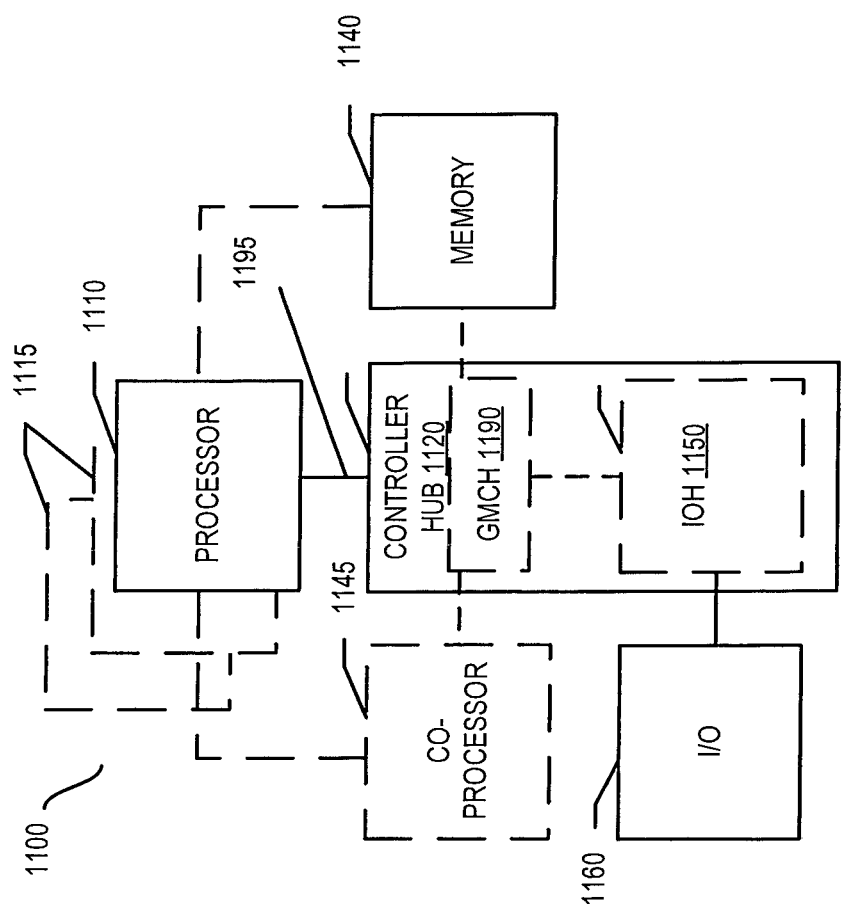
FIG. 11 illustrates a block diagram of a system in accordance with one embodiment of the present invention.

Referring now to FIG. 11, shown is a block diagram of a system 1100 in accordance with one embodiment of the present invention. The system 1100 may include one or more processors 1110, 1115, which are coupled to a controller hub 1120. In one embodiment the controller hub 1120 includes a graphics memory controller hub (GMCH) 1190 and an Input/Output Hub (IOH) 1150 (which may be on separate chips); the GMCH 1190 includes memory and graphics controllers to which are coupled memory 1140 and a coprocessor 1145; the IOH 1150 is couples input/output (I/O) devices 1160 to the GMCH 1190. Alternatively, one or both of the memory and graphics controllers are integrated within the processor (as described herein), the memory 1140 and the coprocessor 1145 are coupled directly to the processor 1110, and the controller hub 1120 in a single chip with the IOH 1150.

The optional nature of additional processors 1115 is denoted in FIG. 11 with broken lines. Each processor 1110, 1115 may include one or more of the processing cores described herein and may be some version of the processor 1000.

The memory 1140 may be, for example, dynamic random access memory (DRAM), phase change memory (PCM), or a combination of the two. For at least one embodiment, the controller hub 1120 communicates with the processor(s) 1110, 1115 via a multi-drop bus, such as a frontside bus (FSB), point-to-point interface, or similar connection 1195.

In one embodiment, the coprocessor 1145 is a special-purpose processor, such as, for example, a high-throughput MIC processor, a network or communication processor, compression engine, graphics processor, GPGPU, embedded processor, or the like. In one embodiment, controller hub 1120 may include an integrated graphics accelerator.

There can be a variety of differences between the physical resources 1110, 1115 in terms of a spectrum of metrics of merit including architectural, microarchitectural, thermal, power consumption characteristics, and the like.

In one embodiment, the processor 1110 executes instructions that control data processing operations of a general type. Embedded within the instructions may be coprocessor instructions. The processor 1110 recognizes these coprocessor instructions as being of a type that should be executed by the attached coprocessor 1145. Accordingly, the processor 1110 issues these coprocessor instructions (or control signals representing coprocessor instructions) on a coprocessor bus or other interconnect, to coprocessor 1145. Coprocessor(s) 1145 accept and execute the received coprocessor instructions.

Figure 12:
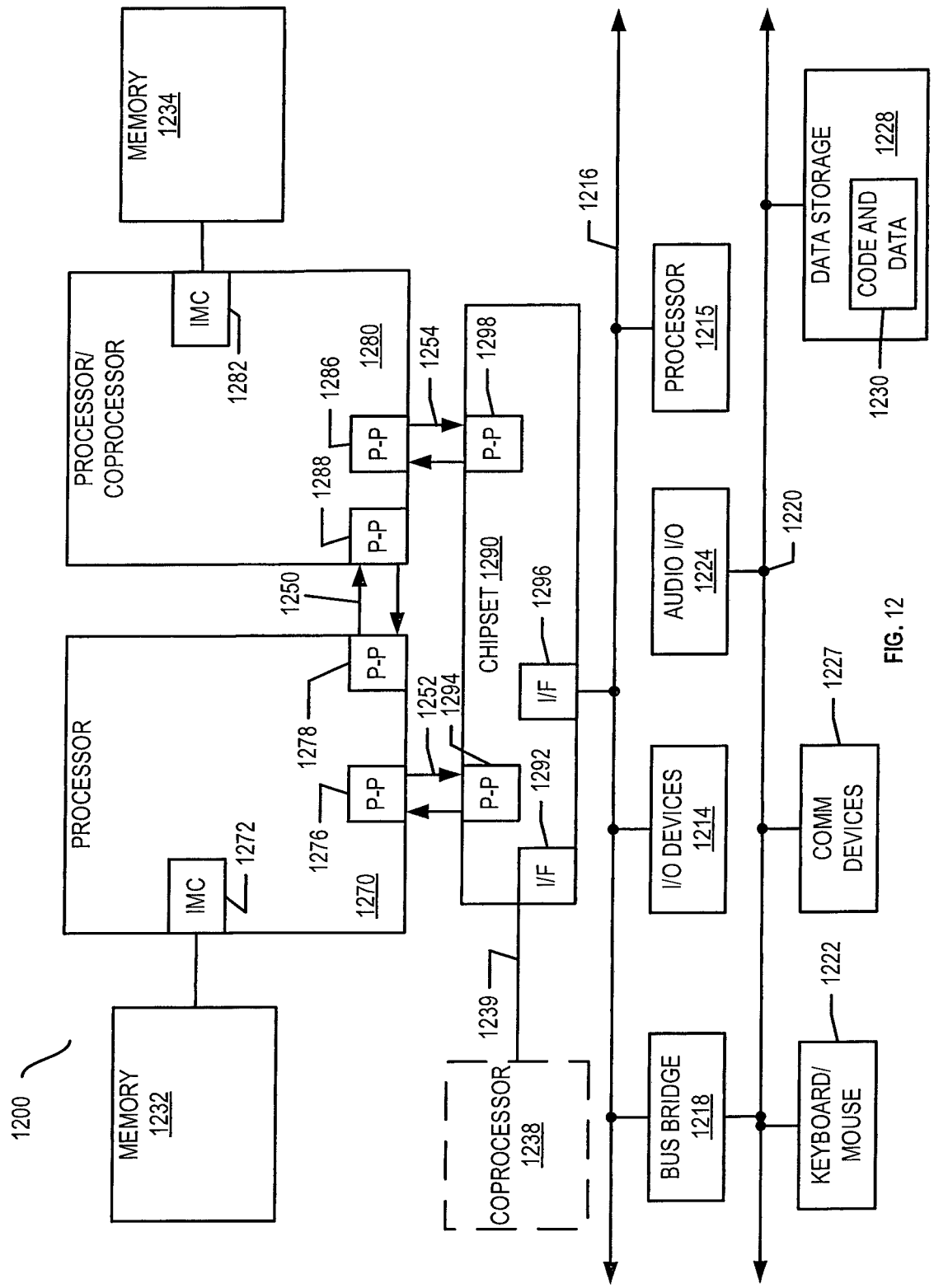
FIG. 12 illustrates a block diagram of a second system in accordance with an embodiment of the present invention.

Referring now to FIG. 12, shown is a block diagram of a first more specific exemplary system 1200 in accordance with an embodiment of the present invention. As shown in FIG. 12, multiprocessor system 1200 is a point-to-point interconnect system, and includes a first processor 1270 and a second processor 1280 coupled via a point-to-point interconnect 1250. Each of processors 1270 and 1280 may be some version of the processor 1000. In one embodiment of the invention, processors 1270 and 1280 are respectively processors 1110 and 1115, while coprocessor 1238 is coprocessor 1145. In another embodiment, processors 1270 and 1280 are respectively processor 1110 coprocessor 1145.

Processors 1270 and 1280 are shown including integrated memory controller (IMC) hardware 1272 and 1282, respectively. Processor 1270 also includes as part of its bus controller hardware point-to-point (P-P) interfaces 1276 and 1278; similarly, second processor 1280 includes P-P interfaces 1286 and 1288. Processors 1270, 1280 may exchange information via a point-to-point (P-P) interface 1250 using P-P interface circuits 1278, 1288. As shown in FIG. 12, IMCs 1272 and 1282 couple the processors to respective memories, namely a memory 1232 and a memory 1234, which may be portions of main memory locally attached to the respective processors.

Processors 1270, 1280 may each exchange information with a chipset 1290 via individual P-P interfaces 1252, 1254 using point to point interface circuits 1276, 1294, 1286, 1298. Chipset 1290 may optionally exchange information with the coprocessor 1238 via a high-performance interface 1239. In one embodiment, the coprocessor 1238 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1290 may be coupled to a first bus 1216 via an interface 1296. In one embodiment, first bus 1216 may be a Peripheral Component Interconnect (PCI) bus, or a bus such as a PCI Express bus or another third generation I/O interconnect bus, although the scope of the present invention is not so limited.

As shown in FIG. 12, various I/O devices 1214 may be coupled to first bus 1216, along with a bus bridge 1218 which couples first bus 1216 to a second bus 1220. In one embodiment, one or more additional processor(s) 1215, such as coprocessors, high-throughput MIC processors, GPGPU's, accelerators (such as, e.g., graphics accelerators or digital signal processing (DSP) hardware), field programmable gate arrays, or any other processor, are coupled to first bus 1216. In one embodiment, second bus 1220 may be a low pin count (LPC) bus. Various devices may be coupled to a second bus 1220 including, for example, a keyboard and/or mouse 1222, communication devices 1227 and a storage hardware 1228 such as a disk drive or other mass storage device which may include instructions/code and data 1230, in one embodiment. Further, an audio I/O 1224 may be coupled to the second bus 1220. Note that other architectures are possible. For example, instead of the point-to-point architecture of FIG. 12, a system may implement a multi-drop bus or other such architecture.

Figure 13:
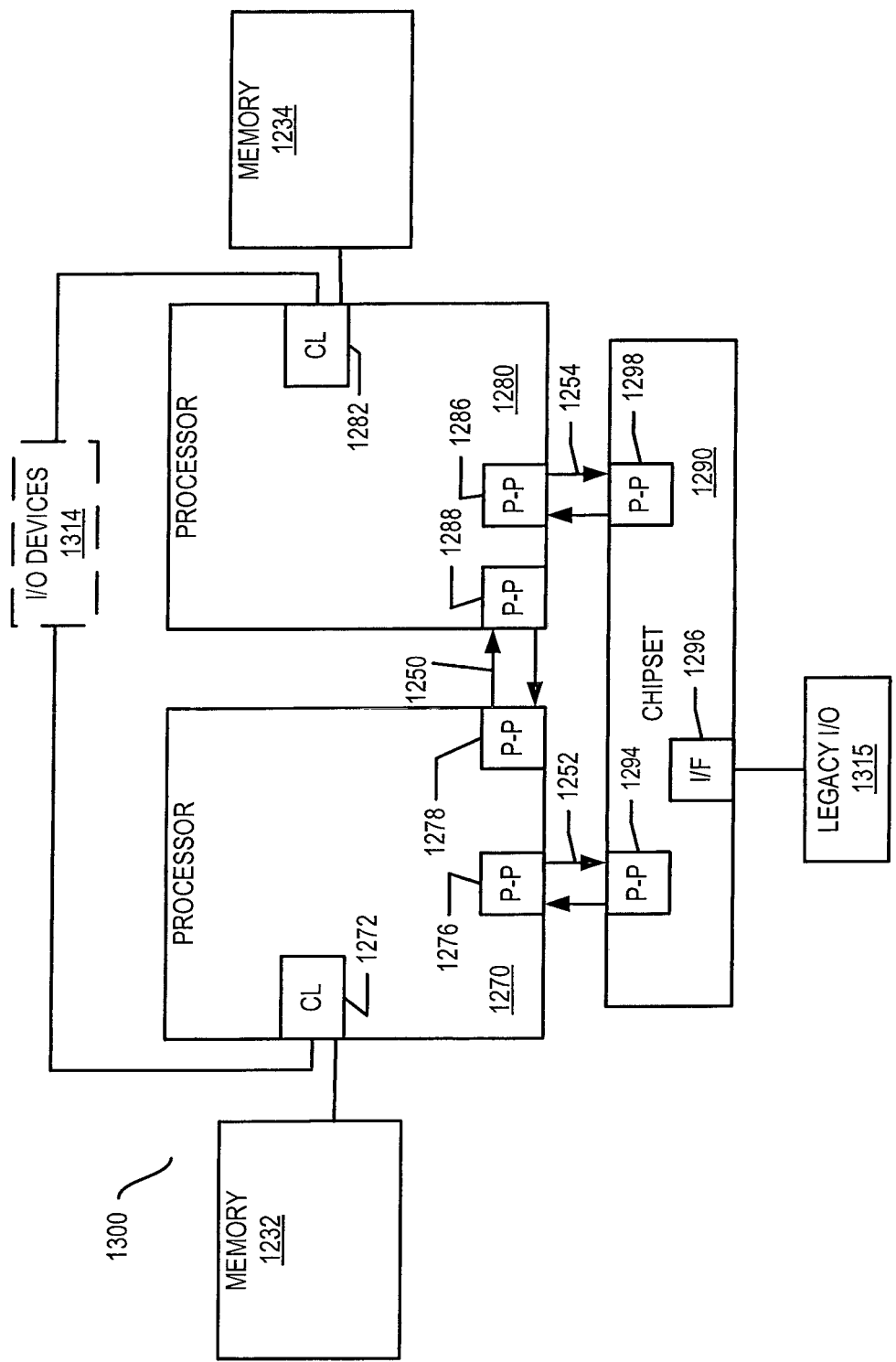
FIG. 13 illustrates a block diagram of a third system in accordance with an embodiment of the present invention.

Referring now to FIG. 13, shown is a block diagram of a second more specific exemplary system 1300 in accordance with an embodiment of the present invention. Like elements in FIGS. 12 and 13 bear like reference numerals, and certain aspects of FIG. 12 have been omitted from FIG. 13 in order to avoid obscuring other aspects of FIG. 13.

FIG. 13 illustrates that the processors 1270, 1280 may include integrated memory and I/O control logic ("CL") 1272 and 1282, respectively. Thus, the CL 1272, 1282 include integrated memory controller hardware and include I/O control logic. FIG. 13 illustrates that not only are the memories 1232, 1234 coupled to the CL 1272, 1282, but also that I/O devices 1314 are also coupled to the control logic 1272, 1282. Legacy I/O devices 1315 are coupled to the chipset 1290.

Figure 14:
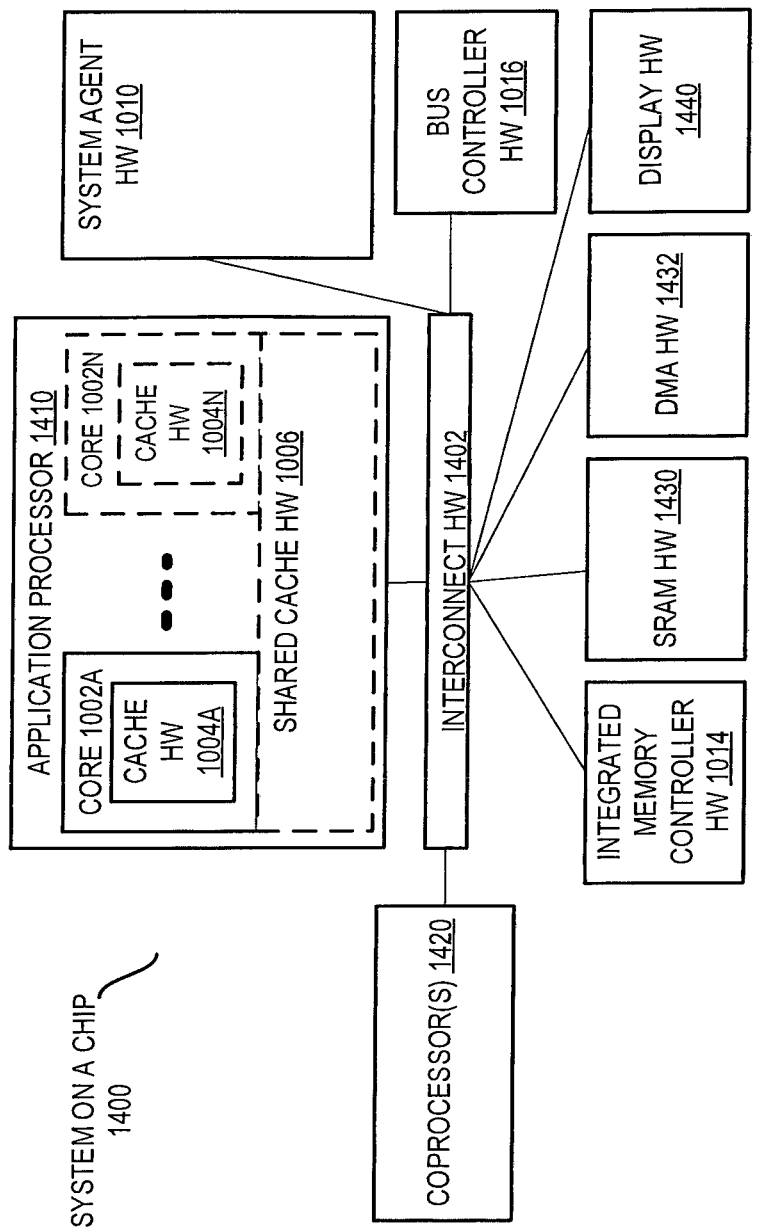
FIG. 14 illustrates a block diagram of a system on a chip (SoC) in accordance with an embodiment of the present invention.

Referring now to FIG. 14, shown is a block diagram of a SoC 1400 in accordance with an embodiment of the present invention. Similar elements in FIG. 10 bear like reference numerals. Also, dashed lined boxes are optional features on more advanced SoCs. In FIG. 14, an interconnect hardware 1402 is coupled to: an application processor 1410 which includes a set of one or more cores 1002A-N and shared cache hardware 1006; a system agent hardware 1010; a bus controller hardware 1016; an integrated memory controller hardware 1014; a set or one or more coprocessors 1420 which may include integrated graphics logic, an image processor, an audio processor, and a video processor; an static random access memory (SRAM) hardware 1430; a direct memory access (DMA) hardware 1432; and a display hardware 1440 for coupling to one or more external displays. In one embodiment, the coprocessor(s) 1420 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1230 illustrated in FIG. 12, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 15:
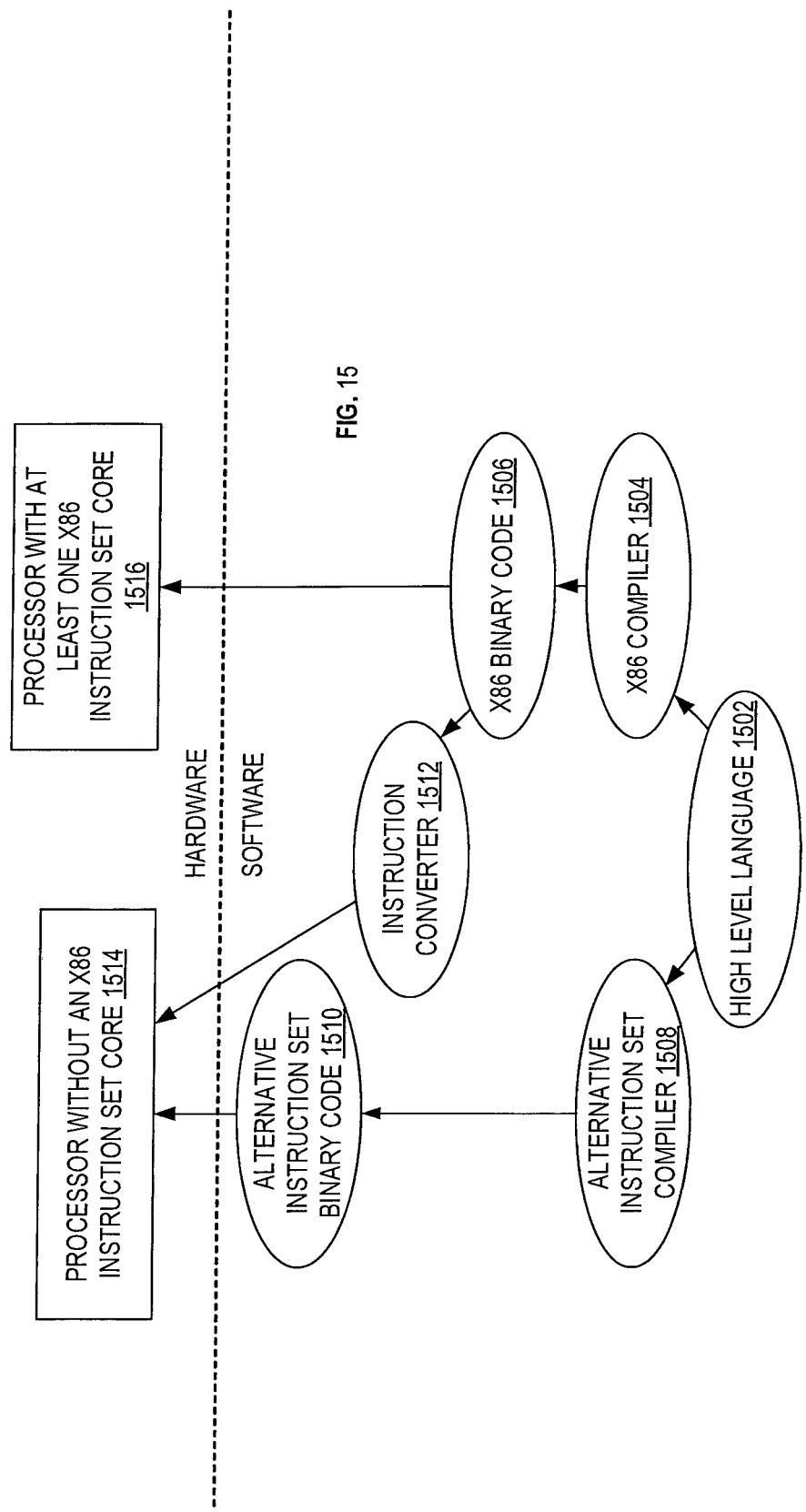
FIG. 15 illustrates a block diagram contrasting the use of a software instruction converter to convert binary instructions in a source instruction set to binary instructions in a target instruction set according to embodiments of the invention.

FIG. 15 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 15 shows a program in a high level language 1502 may be compiled using an x86 compiler 1504 to generate x86 binary code 1506 that may be natively executed by a processor with at least one x86 instruction set core 1516. The processor with at least one x86 instruction set core 1516 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1504 represents a compiler that is operable to generate x86 binary code 1506 (e.g., object code) that can, with or without additional linkage processing, be executed on the processor with at least one x86 instruction set core 1516. Similarly, FIG. 15 shows the program in the high level language 1502 may be compiled using an alternative instruction set compiler 1508 to generate alternative instruction set binary code 1510 that may be natively executed by a processor without at least one x86 instruction set core 1514 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1512 is used to convert the x86 binary code 1506 into code that may be natively executed by the processor without an x86 instruction set core 1514. This converted code is not likely to be the same as the alternative instruction set binary code 1510 because an instruction converter capable of this is difficult to make; however, the converted code will accomplish the general operation and be made up of instructions from the alternative instruction set. Thus, the instruction converter 1512 represents software, firmware, hardware, or a combination thereof that, through emulation, simulation or any other process, allows a processor or other electronic device that does not have an x86 instruction set processor or core to execute the x86 binary code 1506.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method implemented in a multi-core processor, the method comprising:
receiving a conditional read for ownership (CondRFO) from a requester in response to an execution of an instruction to modify a target cache line (CL) with a new value, the CondRFO identifying the target CL and the new value;
determining from a local cache a local CL corresponding to the target CL;
determining a local value from the local CL;
comparing the local value with the new value;
setting a coherency state of the local CL to (S)hared when the local value is same as the new value;
setting the coherency state of the local CL to (I)nvalid when the local value is different from the new value; and
sending a response to the requester, wherein the response comprises a copy of the local CL.

2. The method of claim 1, further comprising:
setting a coherency state of the copy of local CL sent to the requester to (S)hared when the local value is same as the new value; and
setting the coherency state of the copy of local CL sent to the requester to (E)xclusive when the local value is different from the new value.

3. The method of claim 1, wherein the CondRFO comprises a memory address to identify the target CL.

4. The method of claim 1, wherein the CondRFO comprises a CL offset to be used to determine the local value in the local CL.

5. The method of claim 4, wherein determining a local value from a local CL comprises:
identifying a location in the local CL based on the CL offset; and
reading a value from the identified location.

6. A method implemented in a multi-core processor, the method comprising:
decoding a conditional store instruction;
executing a decoded conditional store instruction to modify a target cache line (CL) with a new value;

determining if a local cache contains a valid local CL corresponding to the target CL; and responsive to a determination that the local cache does not contain the valid local CL, sending a conditional read for ownership (CondRFO) to one or more remote cores in the multi-core processor, wherein the CondRFO identifies the target CL and the new value.

7. The method of claim 6, wherein the valid local CL comprises a coherency state of (M)odified, (E)xclusive, or (S)hared.

8. The method of claim 6, wherein responsive to a determination that the local cache contains a valid local CL corresponding to the target CL, further comprises:
   determining a local value from the valid local CL;
   comparing the local value with the new value;
   responsive to a determination that the local value is different from the new value, determining a coherency state of the valid local CL; and
   writing the new value to the valid local CL when the determined coherency state is (S)hared.

9. The method of claim 8, wherein responsive to a determination that the coherency state of the valid local CL is not (S)hared, further comprises:
   sending a request for ownership to one or more cores in the multi-core processor.

10. The method of claim 6, wherein the CondRFO comprises a memory address identifying the target CL.

11. The method of claim 6, wherein the CondRFO comprises a CL offset used to identify a remote value in a remote CL on one of the one or more remote cores, the remote value to be compared with the new value.

12. An apparatus comprising:
   a plurality of hardware processor cores communicatively coupled through an interconnect, each of the hardware processor cores to include a respective local cache, wherein a first processor core of the plurality of hardware processor cores to comprise a cache agent circuit, the cache agent logic circuit to:
      receive a conditional read for ownership (CondRFO) from a second processor core of the plurality of processor cores in response to the second processor core executing an instruction to modify a target cache line (CL) with a new value, the CondRFO identifying the target CL and the new value;
      determine from a local cache of the first processor core a local CL corresponding to the target CL;
      determine a local value from the local CL;
      compare the local value with the new value;
      set a coherency state of the local CL to (S)hared when the local value is same as the new value;
      set the coherency state of the local CL to (I)nvalid when the local value is different from the new value; and
      send a response to the second processor core, wherein the response comprises a copy of the local CL.

13. The apparatus of claim 12, wherein the cache agent circuit to:
   set a coherency state of the copy of local CL sent to the second processor core to (S)hared when the local value is same as the new value; and
   set the coherency state of the copy of local CL sent to the second processor core to (E)xclusive when the local value is different from the new value.

14. The apparatus of claim 12, wherein the CondRFO comprises a memory address to identify the target CL.

15. The apparatus of claim 12, wherein the CondRFO comprises a CL offset to be used to determine the local value in the local CL.

16. The apparatus of claim 15, wherein determining a local value from a local CL comprises:
   identifying a location in the local CL based on the CL offset; and
   reading a value from the identified location.

17. The apparatus of claim 12, wherein the local cache is a level 2 (L2) cache.

18. The apparatus of claim 12, wherein the local cache is a mid-level cache (MLC).

19. An apparatus comprising:
   a plurality of hardware processor cores communicatively coupled through an interconnect, each of the hardware processor cores to include a respective local cache, wherein a first processor core of the plurality of hardware processor cores to comprise:
      a decoder circuit to decode a conditional store instruction;
      an execution circuit to execute a decoded conditional store instruction to modify a target cache line (CL) with a new value;
      a cache agent circuit to:
         determine if a local cache contains a valid local CL corresponding to the target CL; and
         responsive to a determination that the local cache does not contain the valid local CL, send a conditional read for ownership (CondRFO) to one or more other cores of the plurality of hardware processor cores, wherein the CondRFO identifies the target CL and the new value.

20. The apparatus of claim 19, wherein the valid local CL comprises a coherency state of (M)odified, (E)xclusive, or (S)hared.

21. The apparatus of claim 19, wherein responsive to a determination that the local cache contains a valid local CL corresponding to the target CL, the cache agent circuit to:
   determine a local value from the valid local CL;
   compare the local value with the new value;
   responsive to a determination that the local value is different from the new value, determine a coherency state of the valid local CL; and
   write the new value to the valid local CL when the determined coherency state is (S)hared.

22. The apparatus of claim 21, wherein responsive to a determination that the coherency state of the valid local CL is not (S)hared, the cache agent circuit to:
   send a request for ownership to the one or more other cores of the plurality of hardware processor cores.

23. The apparatus of claim 19, wherein the CondRFO comprises a memory address identifying the target CL.

24. The apparatus of claim 19, wherein the CondRFO comprises a CL offset used to identify a remote value in a remote CL on the one or more other cores of the plurality of hardware processor cores, the remote value to be compared with the new value.

25. The apparatus of claim 19, wherein the local cache is a level 2 (L2) cache.

* * * * *